Oct. 28, 1969  H. I. PODELL  3,474,845
SELF-LOCKING THREADED FASTENER
Original Filed April 20, 1966  3 Sheets-Sheet 1

Inventor
Howard I. Podell
By his Attorney
Robert E. Ross

United States Patent Office 3,474,845
Patented Oct. 28, 1969

3,474,845
SELF-LOCKING THREADED FASTENER
Howard I. Podell, Larchmont, N.Y., assignor to United Shoe Machinery Corporation, Flemington, N.J., a corporation of New Jersey
Continuation of application Ser. No. 543,989, Apr. 20, 1966. This application Apr. 1, 1968, Ser. No. 718,016
Int. Cl. F16b *39/284, 39/34*
U.S. Cl. 151—7                                      9 Claims

ABSTRACT OF THE DISCLOSURE

A self-locking screw including an elongated locking element of resilient plastic material received in a coined recess and retained in the recess by a series of opposed tangs formed from the thread ends adjacent the recess.

---

This application is a continuation of application Ser. No. 543,989, filed Apr. 20, 1966 and now abandoned.

This invention relates generally to self-locking threaded fastening devices of the type in which the locking action is achieved by means of a deformable insert body sealed in a recess in the threaded portion of the body, and to a method of manufacture thereof.

Several types of fasteners utilizing this locking principle are known, and have achieved considerable commercial success. In one form a bolt or screw is provided with a pellet of nylon or other suitable plastic disposed in a drilled hole in the side of the threaded portion. In another form, a groove is milled in the side of the bolt, and a strip of suitable plastic is assembled into the strip. In a variation of this latter form, an elongated recess is formed in the side of the bolt by a coining operation, in which a rectangular punch is forced into the bolt.

Each of these methods of forming a locking fastener of the type described has disadvantages which precludes their use in many applications. For example, the pellet type of locking element requires that a cylindrical recess be formed in the side of the bolt to receive the pellet, which considerably reduces its tensile, torsional and fatigue strength. For many applications the pellet must be in a specific predetermined position on the bolt, which frequently prevents the use of off-the-shelf fasteners.

Although the use of the strip type of locking element eliminates the problem of the position of the locking element in the design of an assembly utilizing the fastener, the removal of the metal of the screw to form the recess to receive the strip weakens the screw even more than does the cylindrical recess. The formation of the recess by the milling method is also a relatively expensive operation.

When the recess is formed by the coining method, the operation may be carried on more rapidly and at less cost, however the coining operation, as carried out heretofore causes considerable deformation of the screw shank. Hence to achieve a finished product of standard size, it has been heretofore necessary to start with screws having an undersized shank. Since such screws are commercially available only on special order the manufacture of locking screws having a recess formed in this manner has been necessarily limited to production runs of relatively large volume. Both of the above described forms of self-locking screws with strip type inserts also have other disadvantages, such as the fact that the insert is readily removed by workmen on the assembly line who find it easier to drive the screw without the insert in place, and the fact that the insert often tends to shift longitudinally in the groove when the device is screwed into engagement with a cooperating threaded device.

The object of this invention is to provide a self-locking threaded fastening device which overcomes the above disadvantages, in that it can be produced by the coining method without deformation or weakening of the device, and results in an assembly in which the plastic insert is so affixed in the groove that it can be removed only with great difficulty, and prevents any possibility of longitudinal movement of the strip when the device is assembled with a cooperating fastener member.

Other objects of the invention will be apparent to one skilled in the art from the following detailed description of a specific embodiment thereof.

Figure 1:
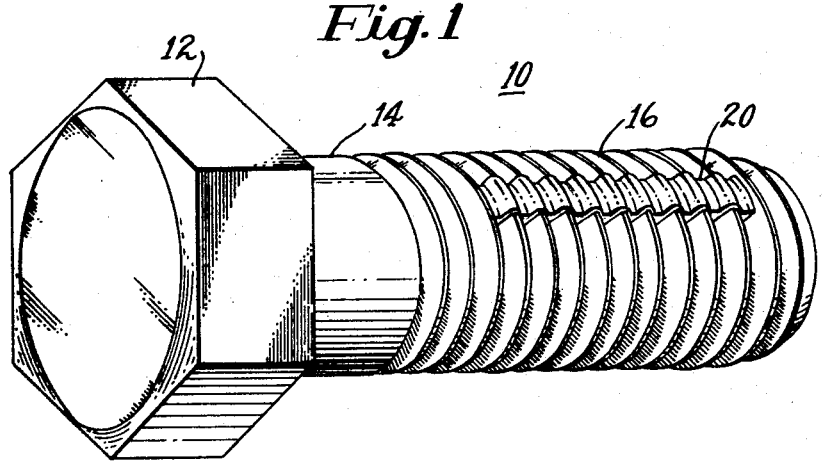
FIG. 1 is a perspective view of a fastening device embodying the features of the invention.
Figure 2:
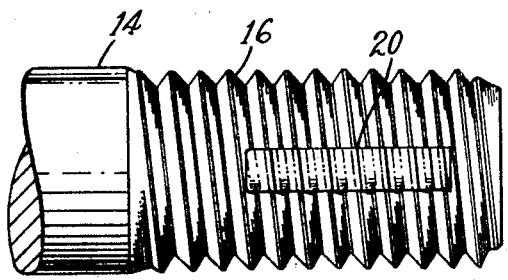
FIG. 2 is a plan view of the fastener of FIG. 1.
Figure 3:
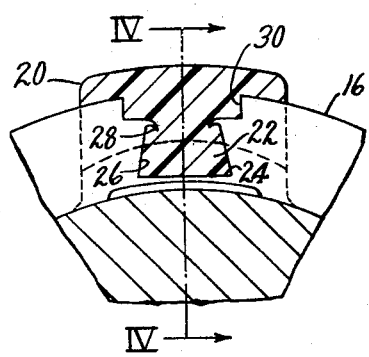
FIG. 3 is a view in section taken on the line III—III of FIG. 4.
Figure 4:
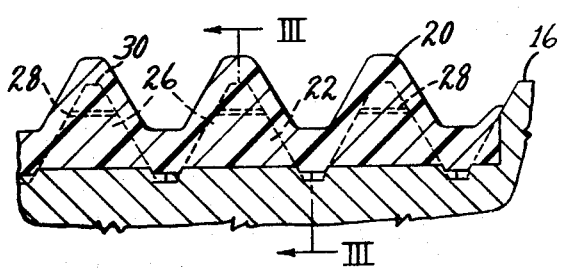
FIG. 4 is a view in section taken on the line IV—IV of FIG. 3.
Figure 8:
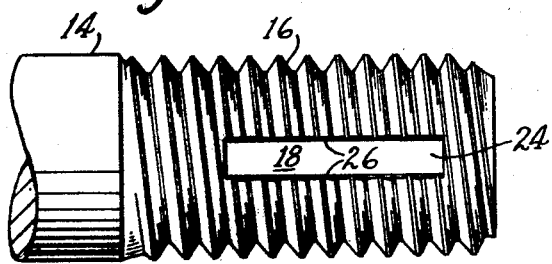
FIG. 8 is a plan view of the fastener of FIG. 5 after removal of the forming die.

Referring to the drawings there is illustrated a screw 10 comprising a head 12 and a shank 14 having threads 16 formed thereon. In the illustrated embodiment the threads are of the unified American standard type, being generally triangular in cross section. Retained in a suitable longitudinal recess 18 formed in the threads is a strip 20 of resilient plastic such as nylon, to render the screw self-locking when it is assembled into a threaded aperture. In the illustrative embodiment of the device, the recess 18 is formed entirely in the threads 16 without entering the shank 14 in a manner to appear hereinafter and hence actually comprises a series of aligned notches or gaps of predetermined shape in the individual threads. Each notch comprises an inner portion 22 bounded by a bottom 24 which is spaced slightly above the root of the threads, a pair of side walls 26 which extend only part way to the crest of the threads with inwardly projecting tang portions 28 disposed at the upper end thereof. Each notch also comprises an outer portion 30 which is wider than the inner portion.

The strip 20, which may be originally in the form of a generally cylindrical rod, is deformed on insertion into the recess in a manner to appear hereinafter, so that the strip material fills the inner and outer portions of the notches and also projects laterally into the unrecessed adjacent portion of the threads. The strip is also deformed after insertion so that the outer surface thereof assumes a configuration which generally follows the shape of the threads over which it lies, for a purpose to appear hereinafter.

Figure 5:
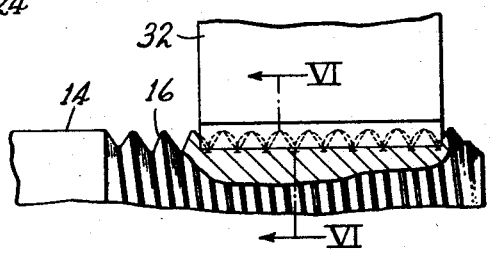
FIG. 5 is a view in side elevation, partly broken away of a screw illustrating the first step in preparing the screw to receive a plastic locking insert.
Figure 6:
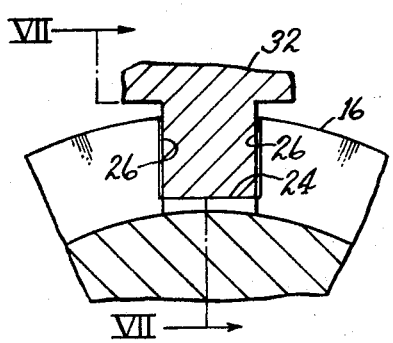
FIG. 6 is a view in section taken on line VI—VI of FIG. 5.

The recess 18 is formed in the following manner. With the screw 10 being held by suitable means, which may be for example, by means of thread-form jaws in a dial press (not shown), a punch 32 is pressed into the screw threads (see FIGS. 5–7) at least to the pitch diameter, but not as deep as the root diameter, so that the material of each thread below the punch is spread axially of the screw. The bottom of the recess so formed is therefore substantially flat and is spaced slightly above the root diameter of the screw (see FIG. 7).

Figure 7:
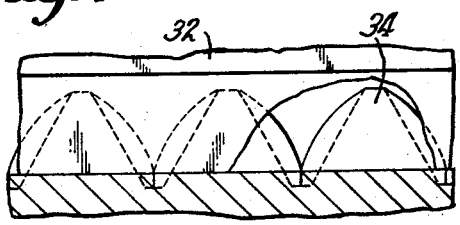
FIG. 7 is a view in section taken on line VII—VII of FIG. 6.
Figure 9:
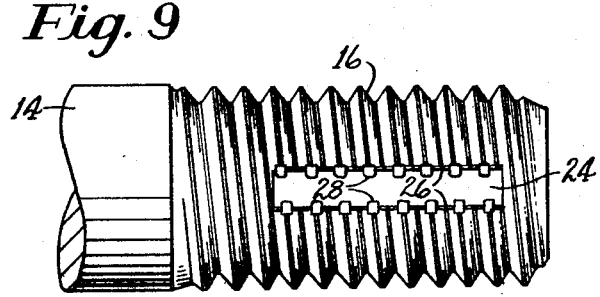
FIG. 9 is a plan view of the fastener of FIG. 8 after it has been subjected to a second forming operation.
Figure 11:
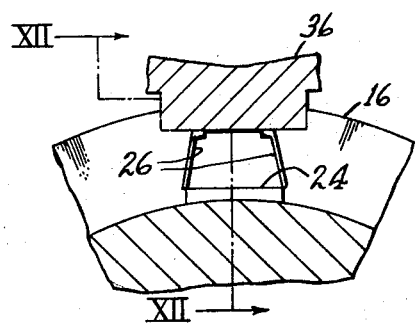
FIG. 11 is a view in section taken on line XI—XI of FIG. 10.
Figure 10:
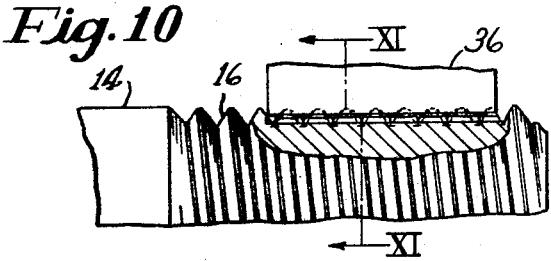
FIG. 10 is a view in side elevation of the screw of FIG. 8 illustrating the action of a second forming die.
Figure 12:
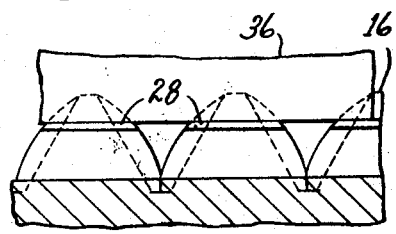
FIG. 12 is a view in section taken on line XII—XII of FIG. 11.

During the above described punching operation the portions of the threads adjacent the recess are also slightly deformed out of shape by the forces applied to the portion of the thread under the die, so that the end portions 34 immediately adjacent the recess are bulged outwardly as illustrated in FIG. 7.

In the next operation, illustrated in FIGS. 9–12, a second punch 36, which has substantially the same length as the punch 32, but with a width, in the illustrated embodiment, of about twice that of the first punch, is centered over the recess formed by the punch 32 and forced against the screw so that the edges of the punch deform downwardly the crests of the portions of the threads immediately adjacent the recess. The punch 36 is forced downwardly to a point substantially below the crest of the threads but above the pitch diameter of the threads, so that the deformed metal of the thread crests moves inwardly forming tangs 28 which project inwardly toward each other an appreciable distance below the crests of the threads. The downward pressure of the tool 36 also causes the thread ends to become inclined toward each other which assists in retaining the locking strip as will appear hereinafter.

Figure 13:
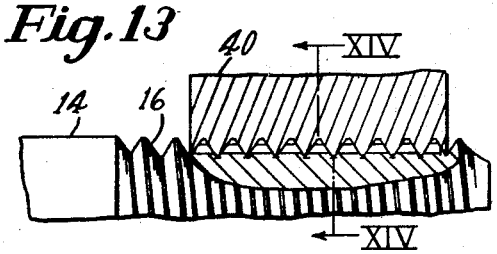
FIG. 13 is a view in side elevation, partly broken away, of the screw of FIG. 9 illustrating a third forming operation.
Figure 14:
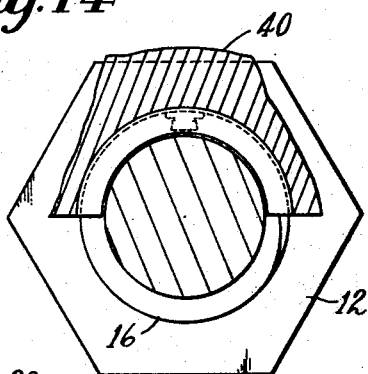
FIG. 14 is a view in section taken on line XIV—XIV of FIG. 13.
Figure 15:
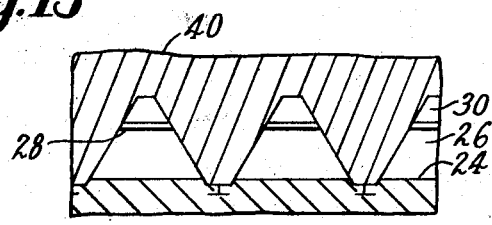
FIG. 15 is an enlarged view of a portion of FIG. 13.

The deformation imparted to the end portions 34 of the threads by the two previously described punching operations is sufficient to prevent the thread, in the condition of FIGS. 9–12 from entering a threaded aperture without interference between the deformed thread ends and the threads of the aperture. The screw is therefore next subjected to a thread reforming operation as illustrated in FIGS. 13–15, by a tool 40, having a lower surface 42 with a configuration corresponding to the original shape of the threads 16. This tool is forced against the portion of the screw in which the recess has been formed with a force sufficient to reform the threads to their original shape, and also to form a series of transverse depressions 44 in the bottom of the recess, so that the crests of the threads of a mating fastener may pass through the recess without interference. The thread reforming operation also removes any burrs that may be present on the ends of the threads resulting from the previous punching operations.

Figure 16:
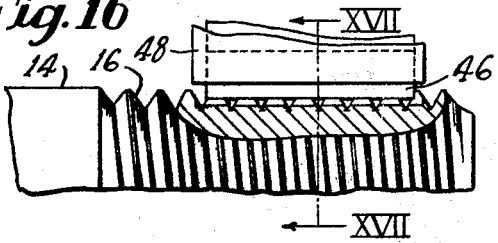
FIG. 16 is a view in side elevation, partly broken away of the screw resulting from the operation of FIG. 13, illustrating the first step in the assembly of a locking strip into the recess in the screw.
Figure 17:
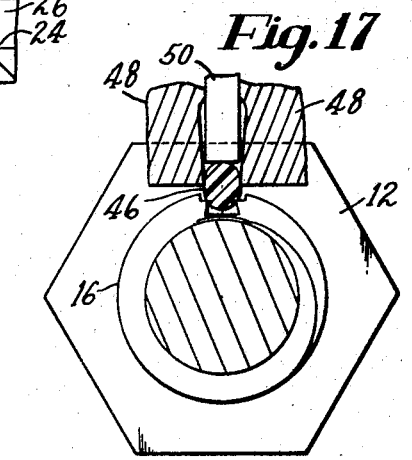
FIG. 17 is a view taken on line XVII—XVII of FIG. 16.
Figure 18:
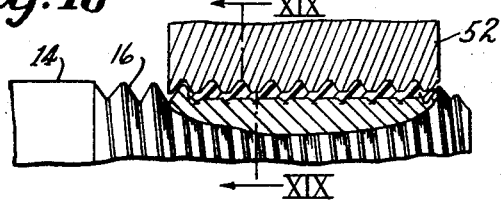
FIG. 18 is a view in side elevation, partly broken away of the screw illustrating the second step in the assembly of the locking strip into the recess.
Figure 19:
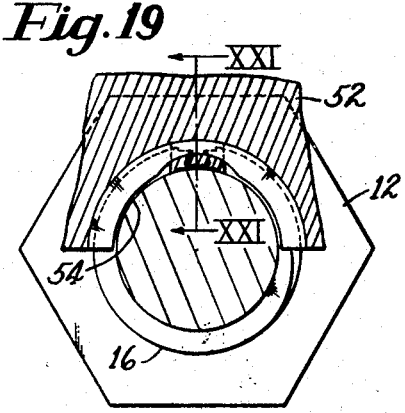
FIG. 19 is a view in section taken on the line XIX—XIX of FIG. 18.

To assemble the locking element 20 into the recess, a rod 46 of resilient plastic is positioned above the recess, compressed laterally by suitable jaws 48 and forced into the recess by a punch 50 (see FIGS. 16 and 17).

To form the assembled locking element into the shape previously described, another tool 52 having a lower surface 54 of thread-form configuration is forced against the plastic strip with sufficient force to cause the plastic to deform to completely fill the notches in the threads and to flow laterally over the adjacent portion of the threads on each side of the recess. The upper surface of the strip also assumes the configuration of the lower surface of the tool 52.

The resulting locking element therefore comprises a relatively thin layer 56 of plastic disposed over the portion of the threads on both sides of the recess 18, said layers being held in position by the medial portion 58 of the locking element disposed in the recess 18. The medial portion 58 is securely locked against removal or endwise movement by the projecting tangs 28 and the inwardly inclined thread ends.

The surface configuration of the medial portion is the same as that of the adjacent portions disposed over the threads, which results in an advantage to be described hereinafter.

Figure 20:
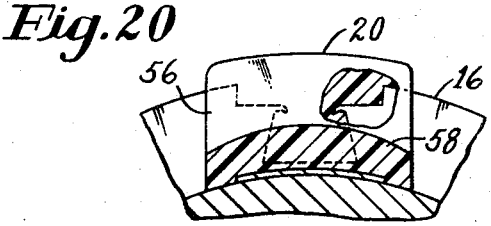
FIG. 20 is a view in section taken on line XX—XX of FIG. 21.
Figure 21:
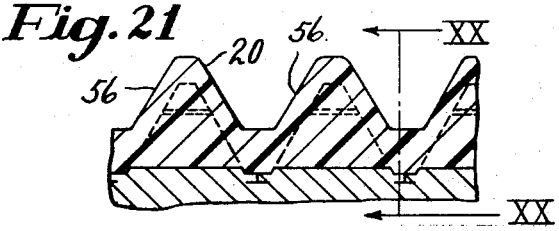
FIG. 21 is an enlarged section taken on line XXXI—XXXI of FIG. 19, with the forming tool removed.

When screws formed of metal which is not excessively hard are processed by the above described method it has been found that the forces imparted to the plastic strip by the forming die 52 tend to bend the ends of tangs 28 downwardly (see FIG. 20). Since the tangs are embedded in the plastic strip, the resulting hook-like ends appreciably increase the strength of retention of the plastic strip.

Fasteners made by the above described process have been found to have a number of advantages over previous fasteners of this type. In addition to being produced by a coining process, without removal of metal, which permits high production rates, the resulting fastener has no appreciable over-all deformation. For example, when a series of ½ inch bolts of Rockwell hardness 33 (C Scale) were processed by the above described method, no measurable deformation of the pitch diameter was found, and the maximum change in dimension of the major diameter, measured on a diameter perpendicular to the direction of punching, was only .002 inch.

The fasteners so produced are also superior to previous fasteners having plastic inserts, in that their fatigue strength and tensile strength are not impaired, since no portion of the bolt shank is removed or deformed.

Another advantage of screws made by the above described process is the fact that the torque required for the first installation is not appreciably greater than the static torque on the first removal, and the static torque on the fifth removal is only about 30% less than on the first removal. For example, commercial specifications for the above mentioned ½ inch bolts (13 threads/inch) require that the first installation torque must not exceed 112 inch pounds, the static torque on the first removal must be at least 22 inch pounds, and the static torque on the fifth removal must be at least 15 inch pounds.

The ½ inch bolts mentioned above when tested to the above specifications, gave the following results: (Average of 8 bolts) first installation 80 inch pounds, first removal 82 inch pounds, fifth removal 58 inch pounds.

The relatively low torque required for the first insertion, compared to the initial locking torque is of great advantage when the fasteners are used in assembly line production where it has been found that workmen sometimes remove the locking strip to facilitate assembly of the screw. The structure of the fastener also makes the casual removal of the strip extremely difficult, and in heat, removal is almost impossible to accomplish without a suitable tool designed to enter the recess and pry under the strip. Even with such a tool, removal requires appreciable time, because of the plurality of hook-shaped tangs 38 embedded in the plastic strip throughout its length. Another unexpected advantage of fasteners made by the above described process is the fact that they have adequate locking torque even when screwed into an unchamfered hole.

Specifications for other types of locking fasteners with plastic inserts almost invariably require the use of a threaded hole having a chamfered entrance to prevent portions of the insert from being sheared off or from being completely dislodged from its recess as it enters the threads of the hole.

When fasteners produced in accordance with this invention are assembled into a threaded hole which does not have a chamfered entrance, there is no tendency for the strip to become dislodged or to move endways and no particles are sheared off of the strip. Loose particles which are often produced during use of fasteners with other types of locking strips can cause difficulty when the fastener is used in hydraulic or pneumatic assemblies, for example.

Another advantage of the fastener described herein is the fact that it is capable of retaining a very high percentage of its locking action even after it and its mating fastener are subjected to high tensile loads.

Although in the illustrated method of forming the recess 18, the first step is a punching or coining operation, this method may not be feasible for use on extremely hard bolts. In such case it has been found possible to accomplish the equivalent of the first step by a milling operation, followed by carrying out the remainder of the steps in the manner described above. Such a procedure permits the locking feature to be added to hard bolts without the necessity of annealing the parts prior to the formation of the recess 18.

Since certain obvious changes may be made in the fastener and method described herein without departing from the scope of the invention, it is intended that all matter contained herein be interpreted in an illustrative and not in a limiting sense.

I claim:

1. A self-locking threaded fastening device, comprising a shank having threads disposed thereon and an elongated recess formed in one side of the shank in the threads by a plurality of aligned notches having inner and outer portions in adjacent threads, the inner portion having a base disposed outwardly of the thread roots, each of said notches being bounded by opposing thread ends including tangs which are inclined inwardly in converging relation, the outer portion of each notch being outwardly of the tangs and including a base and side walls and being wider than the inner notch portion, and a strip of resilient plastic assembled with the recess, said strip having a medial portion disposed in said notches with said tangs embedded therein and laterally extending portions disposed over the threads on each side of the recess.

2. A self-locking threaded fastening device comprising a shank having threads disposed thereon and a plurality of aligned inner notches formed with side walls in adjacent threads, each of said notches being bounded by opposing thread ends, the tops of said thread ends being formed with outer notches disposed inwardly to a position intermediate the major diameter and the pitch diameter, wider than the inner notches and without sideways enlargement in normal thread cross section to provide tangs projecting into the notches, said outer notches having a bottom surface and side walls extending angularly thereto, and a strip of resilient deformable plastic disposed in the notches and impaled on said tangs with some of the material of the plastic strip being disposed in said outer notches and some inwardly of said tangs whereby said tangs are encased in the plastic strip.

3. A fastening device as set forth in claim 2 in which the outermost surface of the plastic strip is provided with transverse grooves conforming generally to the position of the thread valleys.

4. A self-locking threaded fastening device, comprising a shank having threads disposed thereon and an inner recess formed in adjacent threads and having a base, the recess being bounded by opposing thread end portions, the tops of the thread end portions being formed with outer notches disposed inwardly to a position below the crests of the thread and being shallower and wider than the recess, said outer notches having a bottom surface and side walls extending angularly thereto, the thread end portions presenting a normal thread cross section free of lateral enlargement while providing tangs projecting into the notches and a locking strip of deformable resilient material inserted into the recess and impaled on the tangs with some of the material of the plastic strip disposed in the inner and outer notches whereby the tangs are encased in the plastic strip.

5. A self-locking threaded fastening device comprising a shank having threads disposed thereon and a plurality of aligned outer notches formed in adjacent thread crests, said outer notches having a bottom surface and side walls extending angularly thereto, a recess deeper, narrower, with side walls and centrally disposed relatively to the notches, the bottom of the notches outside the recess being disposed between the major and pitch diameters of the thread, the upper side walls of the recess providing strip anchoring tangs free of enlargement in normal thread cross-section and projecting into the recess and a strip of resilient deformable plastic disposed in said outer notches and some inwardly of said tangs whereby said tangs are encased in the plastic strip.

6. A method of imparting a self-locking action to a threaded fastening device, comprising the steps of coining in the threaded portion of the device a parallel sided inner elongated recess which intersects a plurality of threads, coining the end portions of the threads at the recess downwardly and inwardly to form an outer recess wider than the inner recess and tangs which project in converging relationship into the recess below the crests of the threads, and forcing into said recess a strip of resilient deformable plastic to impale it on said tangs with the material of the plastic strip overlying and underlying the tangs and filling said recesses.

7. The method of claim 6 further comprising the step of reforming the end portions of the threads outside the recess to normal thread cross section after the second coining operation and before installation of the plastic strip.

8. A method of imparting a self-locking action to a threaded fastening device, comprising the steps of coining in the threaded portion of the device an elongated recess having generally parallel side walls which intersects a plurality of threads and has a bottom disposed above the root diameter, coining the end portions of the threads adjacent the recess to a level below the crests of the threads to form tangs inclined inwardly toward each other and extending into the recess, and thereafter forcing into said recess a strip of resilient deformable plastic to impale it on said tangs with the material of the plastic strip overlying and underlying said tangs and filling the space between said inwardly inclined tangs whereby said tangs are encased in the plastic strip.

9. A method of preparing a threaded fastening device to receive a locking strip of resilient deformable material thereto to adapt the device for self-locking engagement with a mating threaded member comprising the steps of coining in the threaded portion of the device an elongated recess having generally parallel side walls which intersects a plurality of threads, coining the end portions of the threads adjacent the recess to a level below the crests of the threads to form tangs inclined inwardly toward each other and extending into the recess, and thereafter reforming the end portions of the threads adjacent the recess to a normal thread cross section in preparation for the insertion of the locking strip in anchored relationship in the recess and on the tangs.

References Cited

UNITED STATES PATENTS

| | | | |
|---|---|---|---|
| 3,020,570 | 2/1962 | Wallace et al. | 151—7 |
| 3,150,702 | 9/1964 | Buckley et al. | |
| 3,182,702 | 5/1965 | Nason et al. | |
| 3,182,703 | 5/1965 | Smyth. | |
| 3,279,519 | 10/1966 | Neuschotz | 151—41.73 |
| 3,319,688 | 5/1967 | Rosan et al. | 151—23 |
| 3,328,813 | 7/1967 | Neuschotz | 151—23 |

EDWARD C. ALLEN, Primary Examiner

U.S. Cl. X.R.

10—10